June 1, 1937.   S. D. MURPHY ET AL   2,082,417
COMPOSITE STRUCTURE
Original Filed July 30, 1935

INVENTORS
SHIRLEY D. MURPHY
FRANK V. OSBORN
BY
ATTORNEYS

Patented June 1, 1937

2,082,417

UNITED STATES PATENT OFFICE 2,082,417

COMPOSITE STRUCTURE

Shirley D. Murphy and Frank V. Osborn, Indianapolis, Ind.

Original application July 30, 1935, Serial No. 33,860. Divided and this application January 20, 1936, Serial No. 59,815

5 Claims. (Cl. 20—74)

Our invention relates to a composite structure and, in particular, to a structure having a support of relatively cheap material such as cold rolled steel, and a decorative structure consisting of a combination of stainless steel or the like and a plastic material or the like.

It is the object of our invention to provide decorative moldings or panels having alternative areas of one material, such as a plastic material or the like, which may be of varying colors with borders of stainless steel or other contrasting material to furnish the desired contrasting decorative effect; and, at the same time, to provide a structural support of adequate strength and of cheaper material so as to provide the necessary rigidity for the structure comprising the contrasting material, which support is concealed from the eye of the observer. Due to the high cost of stainless steel, the expense of a molding made entirely of this material is prohibitive. If this material is used entirely for decorative purposes, it is impossible to achieve designs and contrasting color arrangements to relieve the monotony of the molding so formed.

We have produced a structure wherein the utmost decorative effect of contrasting materials is utilized and wherein the main body of the molding which supports borders of stainless steel or the like is of a relatively cheap plastic material or the like, such as, for instance, "celluloid", which is supported by a supporting member of relatively cheap cold rolled steel or the like, to which the celluloid or plastic material is preferably integrally attached.

It is the object of our invention to provide a rigidly supported composite structure of plastic material having contrasting borders of stainless steel, which plastic material, in addition to forming, with the contrasting stainless steel borders, a pleasing contrasting effect, also provides support for the stainless steel borders.

This application is a division of our copending application Serial No. 33,860 filed July 30, 1935.

Referring to the drawing.

Figure 1:
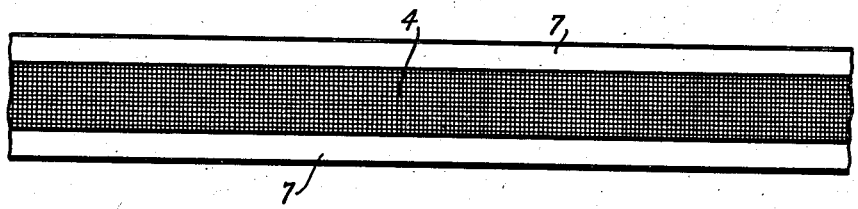
Figure 1 is a top plan view of the composite molding comprising a strip of plastic material bordered by engaging stainless steel strips and supported by a cold rolled steel support which is directly attached to the back of the strip of plastic material.

When referring to such materials as "stainless steel", "celluloid" and "cold rolled steel", it will be understood that we are referring to these materials generically and by way of illustration only, and do not desire to confine ourselves to these particular materials but only to those of the same general characteristics, advantages and disadvantages.

Referring to the drawing in detail, I designates the vertical portion of a cold rolled steel support having an attaching flange 2. The attaching flange is preferably integral with the body of the support and preferably comprises a struck-up portion disposed at an angle to the vertical portion of the support. These flanges preferably comprise separate struck-up portions which are spaced from one another throughout the length of the support. Formed integrally with this cold rolled steel support is a horizontally disposed portion extending at right angles to the portion I, and designated 3. This portion 3 has an attaching face, upon which the strip, plate or sheet 4 of plastic material, such as "celluloid" or the like, is secured.

Figure 2:
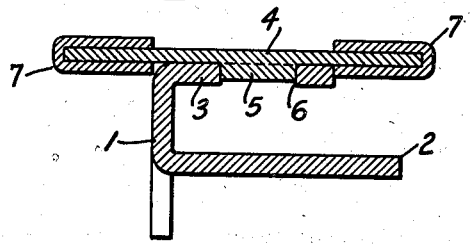
Figure 2 is an end elevational view of the structure shown in Figure 1.

As shown in Figure 2, the portion 3 of the support has a perforation 6 therein for the purpose of receiving the portion 5 of the plate, strip or sheet 4, which portion 5 is preferably extruded under heat or pressure to attach the plate 4 to the attaching face of the portion 3 of the support I. Stainless steel edge-engaging strips 7 are employed to add the necessary decorative effect.

It will be understood that the foregoing description is illustrative and in no wise limiting and that we desire to comprehend within our invention such modifications as may be necessary to adapt it to varying conditions and uses.

Having thus fully described our invention, what we claim as new and desire to secure by Letters Patent is:

1. In combination, an angular backing plate, a plastic plate attached to one face thereof, and stainless steel edging strips turned over and enclosing the edges of said plastic plate at opposite sides of said backing plate.

2. A molding structure comprising a cold rolled steel angle support member having a strip of plastic material rigidly attached thereto, and a pair of edge-engaging strips of stainless steel secured to said strip of plastic material out of contact with said support member and covering the side edge portions of said strip of plastic material.

3. A molding structure comprising a cold rolled steel angle support member having a struck-up attaching flange thereon, said support member having a strip of "celluloid" rigidly attached thereto, and a pair of edge-engaging strips of contrasting material secured to said strip of "celluloid" and supported solely thereby.

4. A molding structure comprising a cold rolled steel angle support member having a struck-up attaching flange integral therewith, said support member having a strip of "celluloid" rigidly attached to one face thereof, and a pair of edge-engaging strips of stainless steel secured to and supported solely by said strip of "celluloid."

5. In combination, an angular backing plate of cold rolled steel having a "celluloid" plate attached to one face thereof, said "celluloid" plate having stainless steel edging strips turned over its edges with the side edges thereof spaced from one another on one side of said "celluloid" plate, whereby to expose a portion of the "celluloid" plate therebetween.

SHIRLEY D. MURPHY.
FRANK V. OSBORN.